(12) United States Patent
Choi et al.

(10) Patent No.: US 8,835,033 B2
(45) Date of Patent: Sep. 16, 2014

(54) BATTERY PACK CASE ASSEMBLY FOR ELECTRIC AND HYBRID VEHICLES USING A PLASTIC COMPOSITE AND METHOD FOR MANUFACTURING THE SAME

(75) Inventors: Chi Hoon Choi, Gyeonggi-do (KR); Gun Goo Lee, Gyeonggi-do (KR); Cheol Choi, Gyeonggi-do (KR); Hee June Kim, Daejeon (KR); Yong Kil Kil, Chungbuk (KR); Yong Hoon Yoon, Daejeon (KR); Tae Min Park, Busan (KR)

(73) Assignees: Hyundai Motor Company, Seoul (KR); LG Hausys, Ltd., Seoul (KR)

( * ) Notice: Subject to any disclaimer, the term of this patent is extended or adjusted under 35 U.S.C. 154(b) by 0 days.

(21) Appl. No.: 13/553,083

(22) Filed: Jul. 19, 2012

(65) Prior Publication Data

US 2013/0252059 A1    Sep. 26, 2013

(30) Foreign Application Priority Data

Mar. 23, 2012 (KR) .................. 10-2012-0029926

(51) Int. Cl.
*H01M 2/10* (2006.01)

(52) U.S. Cl.
USPC .............. 429/100; 429/96; 429/99; 206/703; 180/68.5

(58) Field of Classification Search
CPC ....... H01M 2/1083; Y02E 60/12; B60K 1/04; B60K 2001/0438; B60K 2001/0472; B29K 2101/12; B29K 2105/0845; B29K 2105/128; B29K 2995/0077; B32B 17/04; B32B 2305/08; B32B 2307/54; B32B 2307/546; B32B 2315/085; B32B 553/00
See application file for complete search history.

(56) References Cited

U.S. PATENT DOCUMENTS

| 2009/0011210 | A1  | 1/2009  | Gao et al. | |
| 2011/0294000 | A1* | 12/2011 | Kim et al. | 429/176 |
| 2012/0301765 | A1* | 11/2012 | Loo et al. | 429/100 |

FOREIGN PATENT DOCUMENTS

| JP | 07-043950       | 10/1995 |
| JP | 08186390 A      | 7/1996  |
| JP | 2009087645 A    | 4/2009  |
| JP | 2011146340 A    | 7/2011  |
| JP | 2012022991 A    | 2/2012  |
| KR | 10-1998-0309067 | 8/1998  |
| KR | 10-2010-0009421 | 1/2010  |

OTHER PUBLICATIONS

Rosato, Donald V.; Rosato, Dominick V. "Reinforced Plastics Handbook" ; ISBN-10: 1856174506, ISBN-13: 9781856174503, 2005; Publisher: Elsevier.*

* cited by examiner

*Primary Examiner* — Milton I Cano
*Assistant Examiner* — Wojciech Haske
(74) *Attorney, Agent, or Firm* — Edwards Wildman Palmer LLP; Peter F. Corless (57) ABSTRACT

Disclosed is a battery pack case assembly for an electric or hybrid vehicle. The battery pack case assembly includes a case body and a cover. The case body receives a battery pack, and the cover is coupled to the case body. The case body is formed of a plastic composite in which a long fiber or a blend of a long fiber and a continuous fiber is used as a reinforcing fiber in a plastic matrix. A separate reinforced member is bonded to both side bracket parts for coupling to a vehicle body, and is formed of a plastic composite in which a long fiber, a continuous, or a blend of a long fiber and a continuous fiber is used as the reinforcing fiber in the plastic matrix.

14 Claims, 7 Drawing Sheets

FIG.1

PRIOR ART

FIG.2

PRIOR ART

BATTERY PACK CASE ASSEMBLY FOR ELECTRIC AND HYBRID VEHICLES USING A PLASTIC COMPOSITE AND METHOD FOR MANUFACTURING THE SAME

CROSS-REFERENCE TO RELATED APPLICATION

This application claims under 35 U.S.C. §119(a) the benefit of Korean Patent Application No. 10-2012-0029926 filed Mar. 23, 2012, the entire contents of which are incorporated herein by reference.

BACKGROUND (a) Technical Field

The present invention relates to a battery pack case assembly particularly suitable for electric and hybrid vehicles, and a method for manufacturing a battery pack case assembly. More particularly, it relates to a battery pack case assembly for electric and hybrid vehicles formed at least in part from a plastic composite, and a method for manufacturing the same, which provides reduced weight, and improved structural stiffness, collision characteristics, and dimensional stability.

(b) Background Art

In view of rising oil prices and $CO_2$ regulations, studies have recently been focused on the development of eco-friendly vehicles that can replace typical internal combustion vehicles. Quite a few vehicle manufacturers have already succeeded in commercializing and introducing pure electric vehicles and hybrid vehicles into the market.

Figure 1:
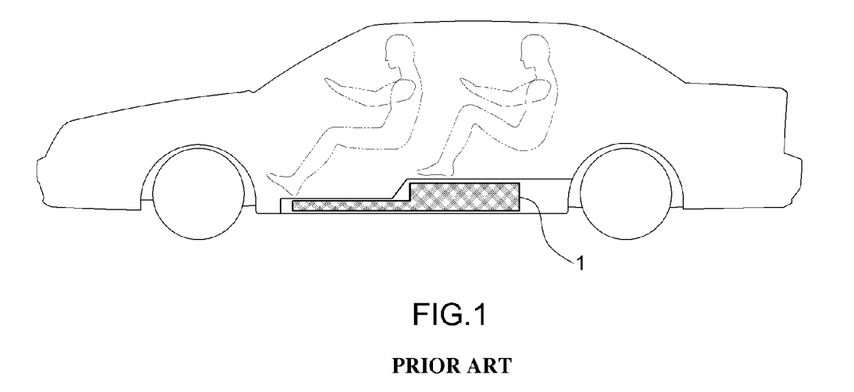
FIG. 1 is a view illustrating a battery mounted in a vehicle.

As shown in FIG. 1, electric vehicles and hybrid vehicles include a battery 1 in the lower portion of the vehicle body or in the trunk space for supplying electric power to an electric motor. The high-voltage battery 1, which is used as a main power source in electric vehicles and hybrid vehicles, has a general structure in which a case assembly houses a plurality of battery packs.

Figure 2:
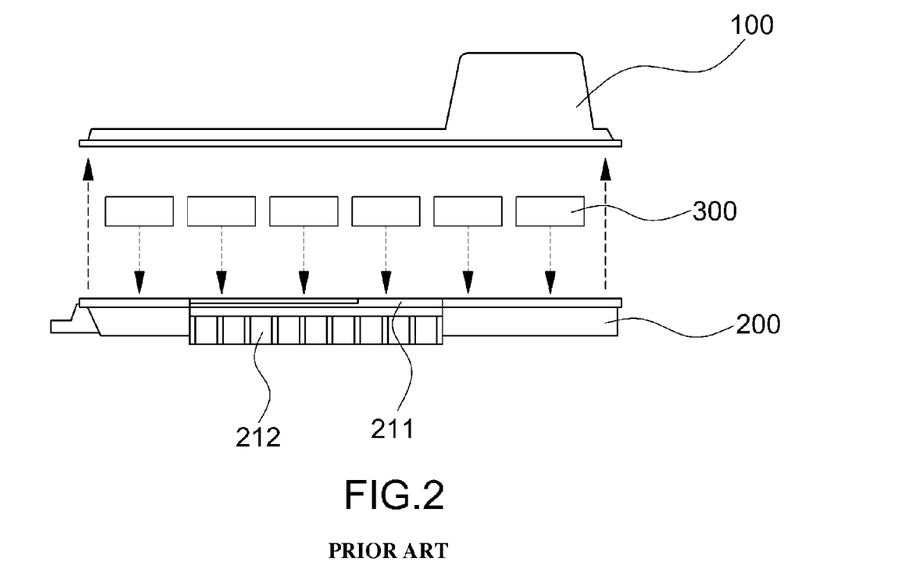
FIG. 2 is a view illustrating the structure of a battery for an electric vehicle, in which a plurality of battery packs are received by a battery pack case assembly.

As shown in FIG. 2, a typical battery pack case assembly includes a lower case body 200 for receiving a plurality of battery packs 300, a cover 100 that can be disposed so as to cover and couple to the upper surface of the lower case 200, and various kinds of structure-reinforcing members (e.g. cross member, side member, etc.). The battery pack case assembly may further house additional related parts, such as a Battery Management System (BMS) and a blower, in addition to the battery pack 300.

Since the Distance to Empty (DTE) of electric vehicles is inversely proportional to the vehicle weight, a reduction of weight has become increasingly important in the development of electric vehicles. Thus, attempts to use lightweight materials for various parts of electric vehicles are being actively made.

For example, an attempt to replace typical metallic materials commonly used to form battery pack cases with a plastic composite material is being made. Since the upper cover does not largely support the load of the battery, the upper cover may be manufactured by a typical plastic composite forming method. However, because the lower case and structure-reinforcing members of the case must be capable of sufficiently supporting the load of a battery, these structures have been manufactured by separately press-forming steel parts or inserting a steel reinforced material into a plastic composite.

However, steel materials applied to the lower case and the structure-reinforcing members of the battery pack case assembly need to have a sufficient thickness to ensure stiffness and durability, and parts such as mounting brackets need to be separately mounted. As a result, the total weight of the battery pack case assembly increases.

Under-vehicle body floor mounting structures for a battery pack case assembly are described in EP 1950070, EP 1939028, EP 1939027, EP 1939025, US 2009/0236162, U.S. Pat. No. 7,610,978, and JP 2009-137408. To improve stiffness, these either use a plastic composite in which a steel frame is inserted or adopt a structure in which a separate cross member formed of a steel material is coupled, followed by mounting in a vehicle body cross member and a side member.

However, such battery pack case assemblies formed with steel material increase the weight of the vehicle body, particularly due to the use of numerous steel parts. As such, the total weight increases, which reduces DTE.

Also, large thermoplastic parts, such as the lower case of the battery pack assembly, are prone to shrinkage and/or distortion according to the molding conditions, and post-strains may further be caused by residual stresses due to repeated contraction and expansion from temperature fluctuations during use.

Thus, a method for improving the dimensional stability of parts while reducing the weight using a plastic composite is desperately needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a battery pack case assembly for a vehicle, particularly an electric or hybrid vehicle, that is formed at least in part of a plastic composite and a method for manufacturing the same. The present invention can provide a reduction in weight and can simultaneously improve the structural stiffness, collision characteristics, and dimensional stability by using a lightweight plastic composite for the case.

In one aspect, the present invention provides a battery pack case assembly for an electric vehicle, including: a case body for receiving a battery pack; and a cover removably coupled to the case body, wherein the case body is formed of a plastic composite in which a reinforcing fiber is provided in a plastic matrix, and a separate reinforced member formed of a plastic composite in which a reinforcing fiber is provided in the plastic matrix. The separate reinforced member may be bonded to both side bracket parts for coupling to a vehicle body. According to various embodiments, the reinforcing fiber used in the case body is a long fiber or a blend of a long fiber and a continuous fiber, and the reinforcing fiber used in the separate reinforced member is a long fiber, a continuous fiber, or a blend of a long fiber and a continuous fiber. The long fibers that can be used in the case member and the separate reinforced member may be the same or different, the continuous fiber that can be used in the case member and the separate reinforced member may be the same or different, and the blend of the long fiber and continuous fiber that can be used in the case member and the separate reinforced member may be the same or different. Further, the reinforcing member used in forming the case body may be the same as the reinforcing member used in forming the separate reinforced member (e.g., the reinforcing member for the case body may be a long fiber while the reinforcing member of the separate reinforced member may be a continuous fiber; the reinforcing member for the case body may be a first type of long fiber while the reinforcing member of the separate reinforced member may be a second type of long fiber, etc.). Alternatively, the reinforcing member used in forming the case body may be different than the reinforcing member used in forming the separate reinforced member.

In an exemplary embodiment, the long fiber of the case body and the reinforced member may have an aspect ratio of about 1,000.

In another exemplary embodiment, the reinforced member may be a bracket type of reinforced member with a reinforcing rib. The reinforced member may further include a closed-section structural region for absorbing collision energy when the side bracket part of the case body and the bracket type of reinforced member are coupled to each other.

In still another exemplary embodiment, the reinforced member may be formed in a planar type (i.e. have a planar-type structure) to be coupled to the both side bracket parts of the case body.

In yet another exemplary embodiment, the battery pack case assembly may further include a planar type of reinforced member disposed at a bottom of the case body. The planar type of reinforced member may be formed using a plastic composite including a continuous fiber as a reinforcing fiber in a plastic matrix.

In still yet another exemplary embodiment, the continuous fiber of the reinforced member disposed at the bottom of the case body may be arranged in one direction in the plastic matrix, or may be fixed in a form of woven fiber in which the continuous fibers cross each other in longitudinal and latitudinal directions.

In a further exemplary embodiment, the continuous fiber is arranged in one direction, which is longitudinal in a right and left width direction. The longitudinal direction of the continuous fiber may be orthogonal to a forward and backward longitudinal direction of the case body.

In another aspect, the present invention provides a method for manufacturing a battery pack case assembly for an electric or hybrid vehicle including a case body for receiving a battery pack, and a cover removably coupled to the case body, the method including: forming the case body using a plastic composite in which a reinforcing fiber is provided in a plastic matrix, wherein the forming of the case body includes: forming a separate reinforced member using a plastic composite in which a reinforcing fiber is provided in the plastic matrix; and bonding the reinforced member to both side bracket parts of the case body for coupling to a vehicle body. The reinforcing fiber of the case body may be a long fiber or a blend of a long fiber and a continuous fiber, and the reinforcing fiber of the separate reinforced member may be a long fiber, a continuous, or a blend of a long fiber and a continuous fiber. As described above, any variety of long fibers, continuous fibers and blends thereof can be provided in the case body and separate reinforced member.

In an exemplary embodiment, in the forming of the case body and the reinforced member, an aspect ratio of a remaining long fiber may be equal to or greater than about 1,000. What is meant by a "remaining" long fiber is the state of the reinforcing fiber itself in the case body as a result of (i.e., after) press forming, and, thus, can also be referred to as residual long fiber. In general, during injection molding, many fibers are broken up, and the maximum length of residual glass fibers after such injection molding is normally 2-5 mm. However, according to the present invention, the maximum length of residual glass fibers is about 20 mm or longer because most fibers remain intact after molding without being broken-up.

In another exemplary embodiment, the forming of the reinforced member may be performed such that the reinforced member is a bracket type with at least one reinforcing rib. The reinforced member may include a closed-section structural region for absorbing collision energy when the side bracket part of the case body and the bracket type of reinforced member are coupled to each other.

In still another exemplary embodiment, the reinforced member may be formed in a planar type (i.e., have a planar-type structure) to be coupled to the both side bracket parts of the case body.

In yet another exemplary embodiment, the method may further include: forming a planar type of reinforced member using a plastic composite, the plastic composite including a continuous fiber as a reinforcing fiber in a plastic matrix; and disposing the planar type of reinforced member at a bottom of the case body.

In still yet another exemplary embodiment, in the forming of the planar type of reinforced member, a uni-directional tape or a woven fiber woven with the continuous fiber may be used.

In a further exemplary embodiment, the uni-directional tape is utilized, and the continuous fiber may be longitudinally arranged in a right and left width direction that is orthogonal to a forward and backward longitudinal direction of the case body.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 3 through 5 are views illustrating a battery pack case assembly according to an embodiment of the present invention, in which

Reference numerals set forth in the Drawings includes reference to the following elements as further discussed below:

100: upper cover
200: lower case (case body)
211: side bracket part
212: bracket type of continuous fiber or long fiber reinforced member
213: reinforcing rib
215a, 215b: reinforcing rib
220a, 220b, 220c: continuous fiber or long fiber reinforced member
300: battery pack It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

The present invention relates to a battery pack case assembly for a vehicle, particularly an electric vehicle or a hybrid vehicle, in which a lightweight plastic composite is used as a material for a case. Particularly, it relates to a case body in which battery packs, among the various other components of a battery pack case assembly, are disposed, i.e., a lower case requiring high load support and stiffness characteristics.

In the present invention, a case may be manufactured by an extrusion-compression molding method using a fiber-reinforced plastic composite to reduce the weight. In particular, a long fiber with an aspect ratio (i.e., Length by Diameter (L/D)) of about 1,000 or more or a continuous fiber (i.e., a fiber without a break therein) may be used to improve the structural stiffness, the collision characteristics, and the dimensional stability of the case.

In the present invention, when a large plastic composite case capable of receiving a plurality of battery packs is manufactured, a continuous fiber may be locally used at a portion where a relatively greater stiffness is needed. The use of the continuous fiber may allow one or more various parts, such as typical structure reinforcing cross members, side members, mounting brackets, to be simultaneously omitted, thus reducing weight and costs.

Hereinafter, an embodiment in which a continuous fiber (or long fiber with an aspect ratio of about 1,000 or more) is applied to the lower case (i.e., the case body that requires high load support and high stiffness characteristics) will be described in detail with reference to the accompanying drawings. However, the continuous fiber (or long fiber with an aspect ratio of about 1,000 or more) may also be applied to a cover (i.e. upper cover that is disposed on and coupled to cover the lower case.

FIG. 2 is a view illustrating the structure of a battery for an electric vehicle, in which a plurality of battery packs are received by a battery pack case assembly according to an embodiment of the present invention. The battery pack case assembly may include a lower case (also referred to as a case body) 200 for receiving a battery pack 300 and a cover (also referred to as an upper cover) 100 coupled to the lower case 200.

Figure 3:
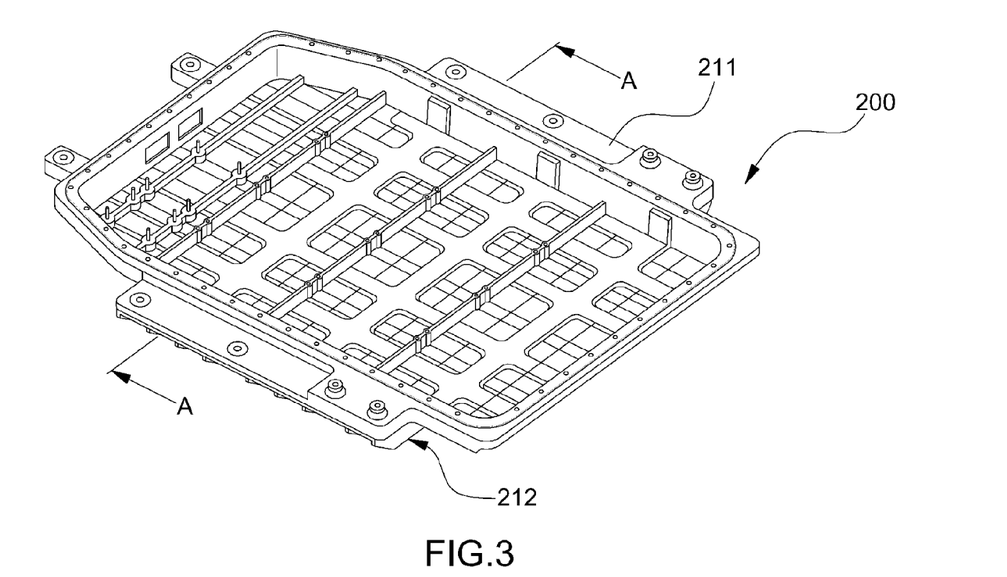
FIG. 3 is a perspective view illustrating an upper surface of a lower case.
Figure 4:
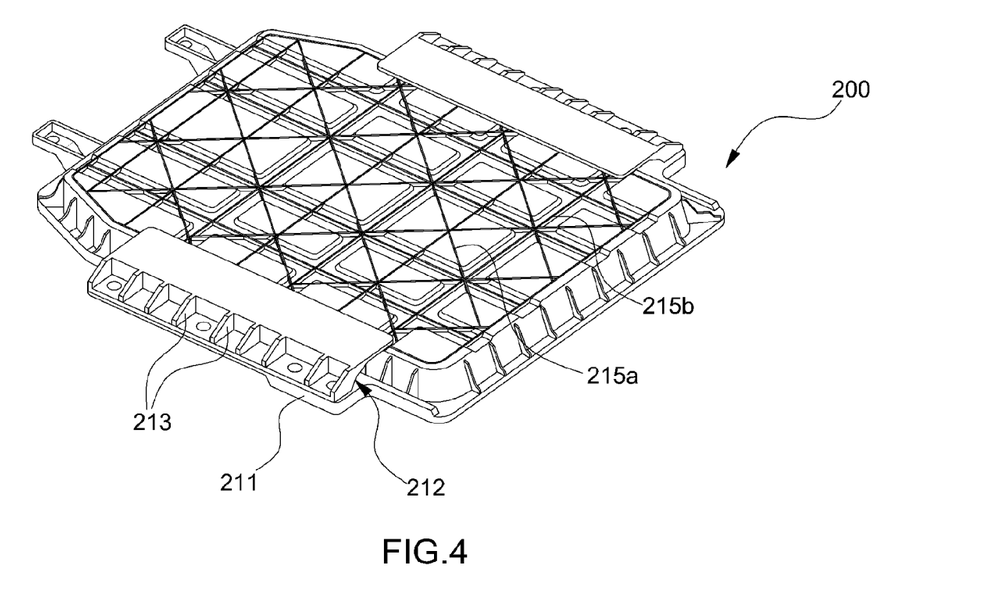
FIG. 4 is a perspective view illustrating a lower surface of the lower case.
Figure 5:
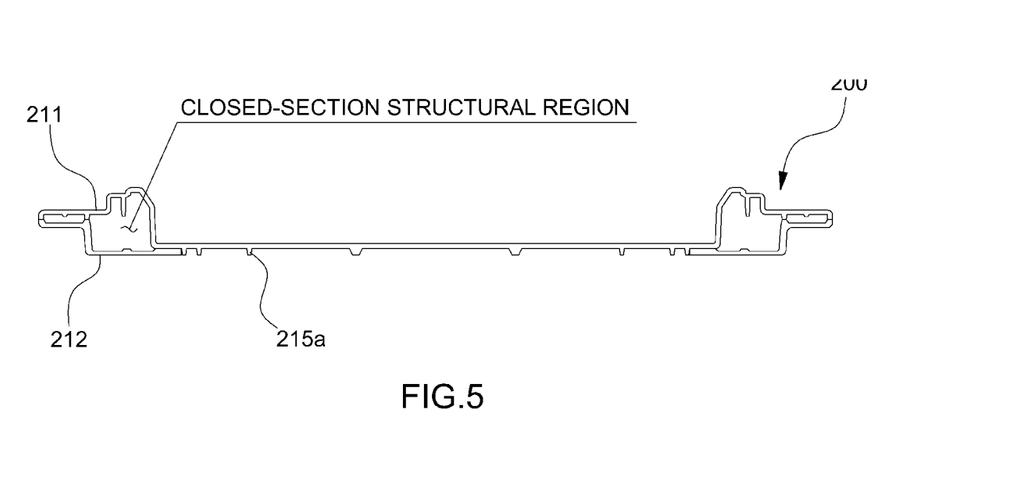
FIG. 5 is a cross-sectional view taken along line A-A of FIG. 3.

FIGS. 3 through 5 are views illustrating a battery pack case assembly according to an embodiment of the present invention, in which FIG. 3 is a perspective view illustrating an upper surface of a lower case 200, FIG. 4 is a perspective view illustrating a lower surface of the lower case 200, and FIG. 5 is a cross-sectional view taken along line A-A of FIG. 3

Referring to FIG. 3, the lower case 200 may be manufactured using Long Fiber Reinforced Thermoplastics (LFRT) in which a long fiber is reinforced in a plastic matrix.

In this case, the plastic matrix of the fiber reinforced composite may include one or more thermoplastic resin materials, including but not limited to Polypropylene (PP), Polyamide (PA), Polyether Ether Ketone (PEEK), Polycarbonate (PC), Polyphenylene Sulfone (PPS), Polyphenylene Ether (PPE), and Thermoplastic Polyurethane (TPU).

The long fiber used as a reinforcing fiber may be selected from glass fibers, carbon fibers, aramid fibers, volcanic ash fibers, natural fibers, and combinations thereof.

When the lower case 200 is press-formed using the fiber reinforced thermoplastic composite containing the reinforcing fiber, the lower case 200 may be formed such that the length of remaining or residual reinforcing fiber is such that it provides the fiber with an aspect ratio of about 1,000 or more.

In particular, when the aspect ratio of the remaining or residual reinforcing fiber is less than about 1,000, a sufficient stiffness reinforcing effect may not be achieved. According to preferred embodiments, the aspect ratio of the remaining reinforcing fiber may range from about 1,000 to about 10,000.

Generally, the dimensional stability of parts may be directly affected by the shape of the parts, but may be improved by the proper selection of materials and forming methods. Thus, according to various embodiments, the fiber reinforced plastic composite case may be manufactured by an extrusion-compression molding method that can minimize a residual stress caused by a shear force during the product molding.

According to various embodiments, when manufacturing the lower case 200, the long fiber may account for about 30 wt % to about 70 wt % of the total weight of the plastic composite used in forming the lower case 200. When the weight of the long fiber is less than about 30 wt %, desired mechanical characteristics may not be achieved. On the other hand, when the weight of the long fiber is greater than about 70 wt %, the flowability may be reduced during the molding, causing reduction of moldability and deterioration of the exterior quality.

When the fiber reinforced plastic composite lower case 200 is manufactured, the long fiber and the continuous fiber may be blended and used as a reinforcing fiber. In particular, a continuous fiber type of reinforcing fiber may be blended with the long fiber. The continuous fiber may be applied to the whole region of the lower case 200 (i.e. throughout the lower case 200), and in some preferred embodiments, the continuous fiber may be locally applied only to one or more portions where high stiffness is desired.

For example, the continuous fiber may be partially applied only to portions of the lower case 200 at which typical structure-reinforcing members, such as cross members, side members, and mounting brackets, are disposed, or to portions of the lower case 200 coupled to the vehicle body through bolting and the like. When the continuous fiber is locally applied, typical structure-reinforcing members may be formed integrally with the case placement of the continuous fiber. Accordingly, these separate parts (e.g. cross members, side members, mounting brackets, etc.) may be omitted.

In a related art, a lower case may be manufactured using a fiber reinforced plastic composite, and a double overlapping plate structure with a closed-section structural region may be formed instead of a simple planar shape to absorb collision energy. Thus, structural part stiffness and collision characteristics may be achieved.

On the other hand, in the present invention, the lower case 200 may be manufactured in a single layer structure instead of a double overlapping plate, and the long fiber and the continuous fiber with excellent mechanical properties and dimensional stability may be wholly or locally used together. Thus, typical structure-reinforcing members (i.e., peripheral parts such as cross members, side members, mounting brackets) can be omitted to achieve weight reduction, manufacturing process reduction, productivity improvement (mass-producible), and cost savings.

Separate from the lower case 200, a separate reinforced member (hereinafter, referred to as a continuous fiber reinforced member) 212 may be formed of a plastic composite in which a continuous fiber is used as a reinforcing fiber in a plastic matrix. The continuous fiber reinforced member 212 may be locally coupled to portions of the lower case 200 on which loads are concentrated during the molding of the lower case 200.

In addition to the continuous fiber used as the reinforcing fiber of the lower case 200, the continuous fiber reinforced member 212 may be additionally used. The advantages of using the continuous fiber in the reinforced member 212 may be similar to those of using the continuous fiber in the lower case 200 as described above.

The continuous fibers used in the lower case 200 and the separated continuous fiber reinforced member 212 may be selected from glass fibers, carbon fibers, aramid fibers, volcanic ash fibers, natural fibers, and combinations thereof.

The plastic matrix of the continuous fiber reinforced member 212 may include at least one thermoplastic resin materials such as Polypropylene (PP), Polyamide (PA), Polyether Ether Ketone (PEEK), Polycarbonate (PC), Polyphenylene Sulfone (PPS), Polyphenylene Ether (PPE), and Thermoplastic Polyurethane (TPU), and combinations thereof.

The plastic matrixes of the lower case 200 and the continuous fiber reinforced member 212 may be identical to or different from each other. When an identical plastic matrix is used, the interfacial bonding strength between different kinds of parts may be further improved.

Figure 6:
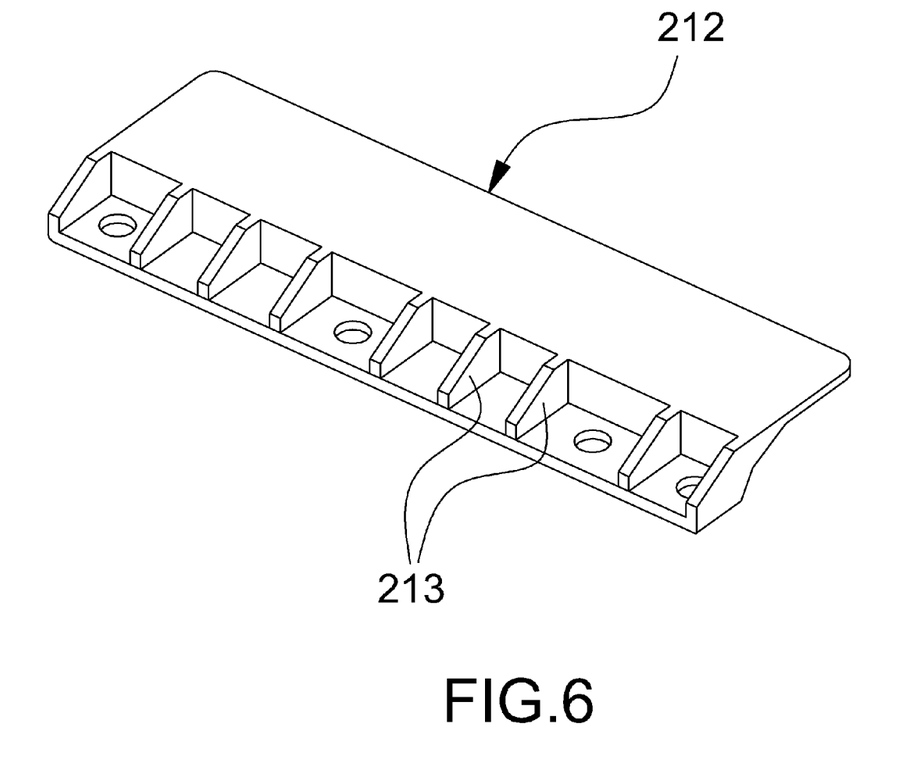
FIG. 6 is a perspective view illustrating a continuous fiber reinforced member applied to a side bracket part of the lower case according to an embodiment of FIGS. 3 through 5.
Figure 7:
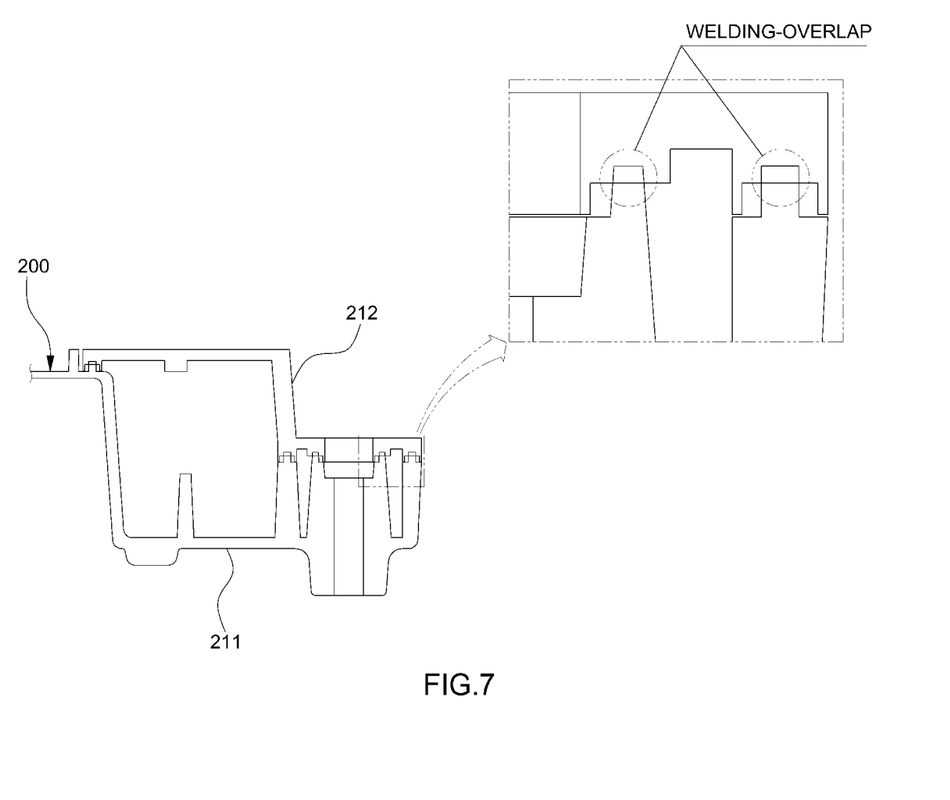
FIG. 7 is a cross-sectional view illustrating a continuous fiber reinforced member coupled to a side bracket of the lower case according to an embodiment of FIGS. 3 through 5.

As shown in FIGS. 3 through 5, the continuous fiber reinforced member 212 may be applied to side bracket parts 211 that protrude from both right and left sides of the lower case 200, respectively. FIG. 6 is a perspective view illustrating a continuous fiber reinforced member 212 that can be applied to a side bracket part 211 of the lower case. FIG. 7 is a cross-sectional view illustrating a continuous fiber reinforced member 212 coupled to a side bracket part 211 of the lower case 200.

Referring to FIGS. 3 through 5 and 7, the side bracket parts 211 may protrude from both right and left sides of the lower case (case body) 200 for bolt coupling (or other suitable coupling) with the vehicle body. The continuous fiber reinforced member 212 may be coupled to the under/lower surface of the side bracket part 211.

Thus, the continuous fiber reinforced member 212 and the side bracket parts 211 integrally formed on both sides of the lower case 200 may form a side bracket for coupling with the vehicle body.

As shown in FIGS. 5 and 7, the continuous fiber reinforced member 212 constituting the side bracket may have a bracket shape that can form a closed-section structural region when the continuous fiber reinforced member 212 is coupled to the side bracket part 211 of the lower case 200.

Referring to FIG. 6, a plurality of reinforcing ribs 213 may be disposed on the undersurface of the continuous fiber reinforced member 212. The plurality of reinforcing ribs 213 may be disposed at a certain interval, for example, a uniform or non-uniform interval.

The continuous fiber reinforced member 212 may be bonded to the lower case 200 by any suitable means, such as an adhesive or one of vibration welding, ultrasonic welding, Infrared (IR) welding, hot plate welding, laser welding, and thermal welding.

According to embodiments of the present invention, instead of the continuous fiber, a long fiber may be used as a reinforcing fiber for the reinforced member 212 that constitutes the side bracket of the lower case 200. In this case, the aspect ratio of remaining or residual long fibers may be equal to or greater than about 1,000 during the press molding of the reinforced member 212 to achieve a sufficient stiffness reinforcing effect.

Specifically, the long fiber reinforced member 212 may have a bracket shape and may be reinforced with a long fiber with an aspect ratio of about 1,000 or more. According to various embodiments, the aspect ratio of the long fiber may range from about 1,000 to about 10,000 during the press molding.

The long fiber may account for about 30 wt % to about 70 wt % of the total weight of the plastic composite that is used as a material for molding of the long fiber reinforced member 212. When the weight of the long fiber is less than about 30 wt %, desired mechanical characteristics may not be achieved. On the other hand, when the weight of the long fiber is greater than about 70 wt %, the flowability may be reduced during the molding, causing reduction of moldability and deterioration of the exterior quality.

According to further embodiments, the long fiber and the continuous fiber may be blended and the blend may be used as a reinforcing fiber for the reinforced member 212.

Figure 8:
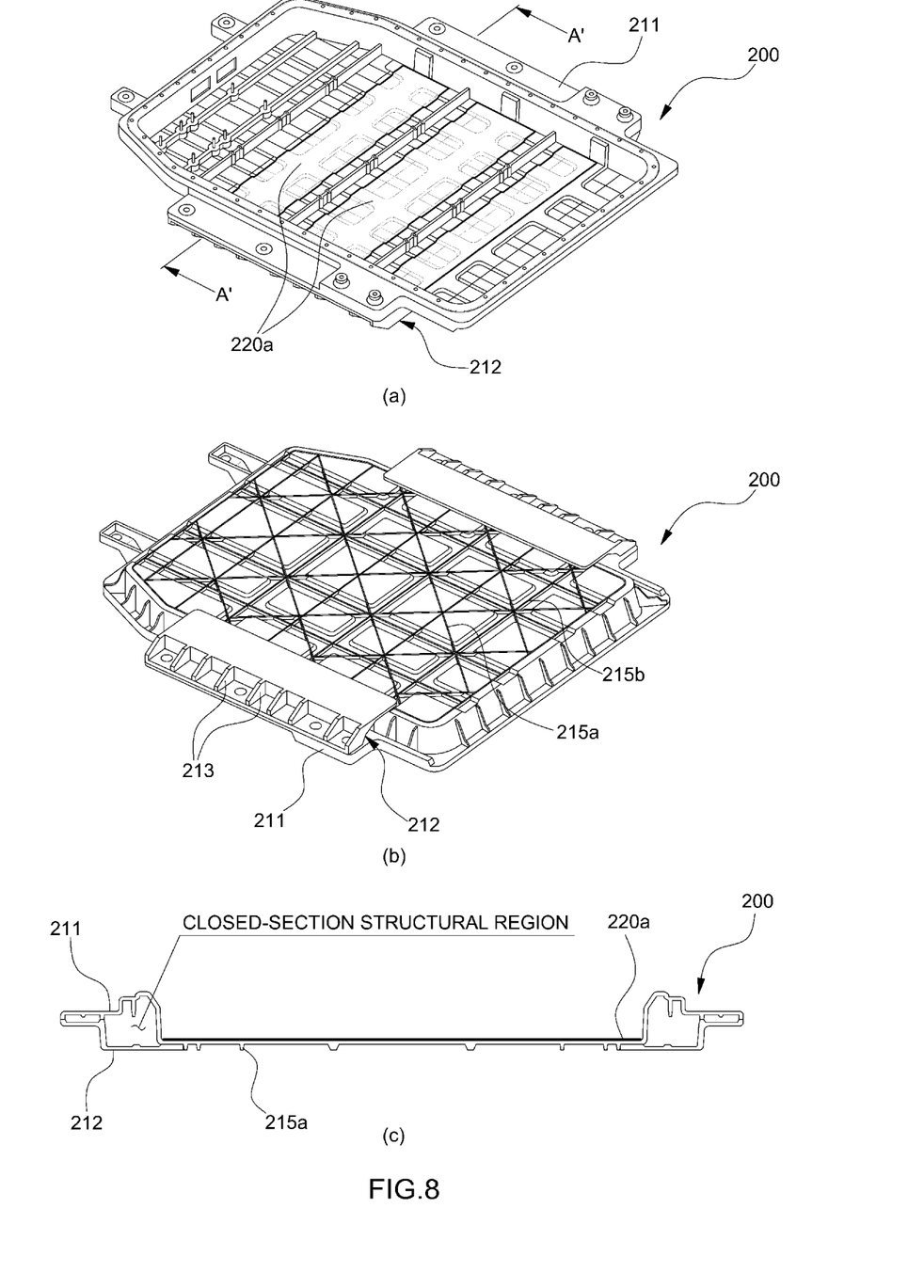
FIG. 8 is a view illustrating a planar type of continuous fiber reinforced member disposed on the bottom of a lower case according to another embodiment of the present invention.
Figure 9:
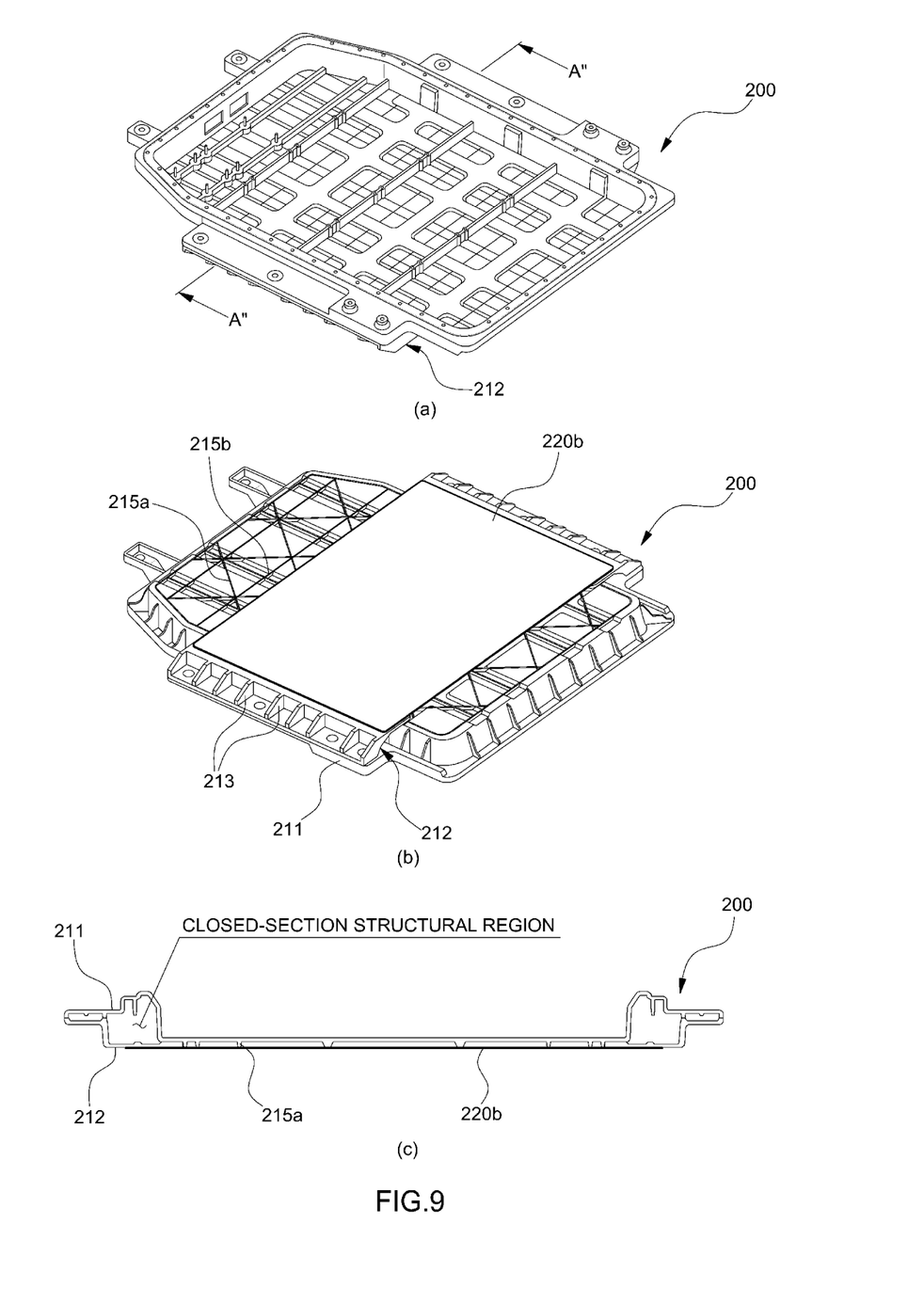
FIG. 9 is a view illustrating a planar type of continuous fiber reinforced member with a large area, disposed on the undersurface of a lower case according to another embodiment of the present invention.

In order to increase the structural stiffness and the collision energy absorbing performance of the lower case 200, a planar type (i.e. planar in structure) of continuous fiber reinforced members 220a and 220b may be locally disposed on the bottom of the lower case (case body) 200.

In particular, a plurality of continuous fiber reinforced members 220a and 22b may be integrally formed during the molding of the lower case 200. Also, the continuous fiber reinforced members 220a and 220b may be cut into appropriate sizes as desired, and may then be disposed on the bottom of the lower case 200 in a single layer or in multiple layers, respectively.

The continuous fiber reinforced members 220a and 22b may be buried in the bottom of the lower case 200, or may be attached to the surface of the bottom of the lower case 200.

In particular, the continuous fiber reinforced members 220a and 220b may be disposed on the upper surface (inner surface), the undersurface, or both upper surface and undersurface of the lower case 200 as desired in a particular configuration and within a certain area.

FIG. 8 is a view illustrating a plurality of a planar type of continuous fiber reinforced member 220a disposed on the bottom of a lower case 200 according to an embodiment of the present invention.

FIG. 9 is a view illustrating a planar type of continuous fiber reinforced member 220b with a large area, disposed on the undersurface of a lower case 200 according to another embodiment of the present invention.

Thus, in the present invention, since the planar type of continuous fiber reinforced members 220a and 220b may be locally installed in the lower case 220, the structural stiffness and the collision energy absorbing performance of the lower case 200 can be improved.

To install the continuous fiber reinforced members 220a and 220b, the continuous fiber reinforced members 220a and 220b may be cut into appropriate sizes, and then may be stacked in a single or multiple layers and preheated. Thereafter, the continuous fiber reinforced members 220a and 220b may be placed or mounted on desired locations of a mold of the lower case 200, and then the lower case may be molded by an extrusion-compression molding apparatus or the like.

When a high-temperature fiber reinforced composite transferred as a material of the lower case 200 is disposed in the mold for extrusion molding, the lower case 200 can be integrally formed with the continuous fiber reinforced members 220a and 220b without a separate subsequent process.

Figure 10:
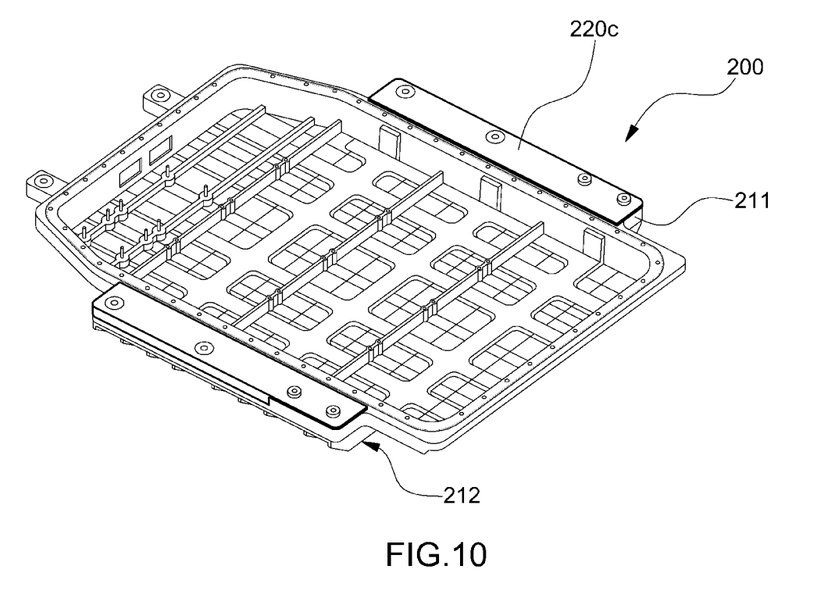
FIG. 10 is view illustrating a planar type of continuous fiber reinforced member coupled to both side bracket parts of a lower case according to another embodiment of the present invention.

FIG. 10 is a view illustrating a planar type of continuous fiber reinforced member 220c coupled to both side bracket parts 211 of a lower case 200 according to another embodiment of the present invention. As shown, the continuous fiber reinforced member is disposed at two locations. Of course, any number of locations could suitably be used and, thus, the invention is not limited to only the depicted number and positions of continuous fiber reinforced members 220c.

In this embodiment, instead of the bracket type of continuous reinforced member 212 described above, a planar type of continuous fiber reinforced member 220c may be disposed. The continuous reinforced member 212 may be formed of the same materials as the bracket type of continuous reinforced member 212.

Figure 11:
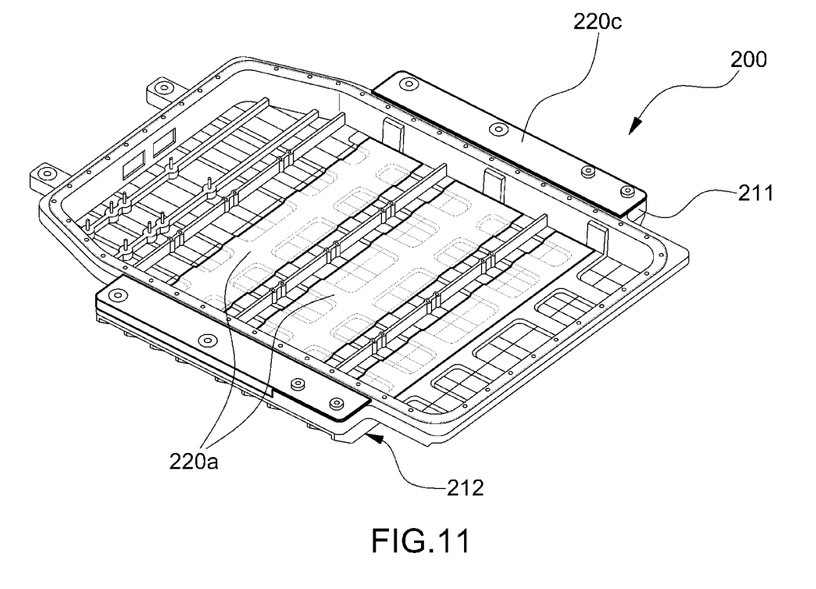
FIG. 11 is a view illustrating a planar type of continuous fiber reinforced members coupled in plurality to both side bracket parts and the bottom of a lower case according to another embodiment of the present invention.

FIG. 11 is a view illustrating a planar type of continuous fiber reinforced members 220a and 220c coupled in plurality to both side bracket parts 211 and the bottom of a lower case 200 according to another embodiment of the present invention. In particular, according to this embodiment, the continuous fiber reinforced members continuous fiber reinforced members 220a and 220c are disposed at five locations. Of course, any number of locations could suitably be used and, thus, the invention is not limited to only the depicted number and positions of continuous fiber reinforced members 220a and 220c.

Here, the continuous fiber reinforced member 220a on the bottom of the lower case 200 may be disposed by a method and a structure similar to those of FIGS. 8 and 9 (the continuous fiber reinforced member may also be disposed on the undersurface of the lower case 200).

According to various embodiments, the reinforced members 220a, 220b and 220c that are separately manufactured and disposed on the lower case 200 may include a long fiber with an aspect ratio of about 1,000 or more as a reinforcing fiber instead of the continuous fiber.

The long fiber reinforced members 220a, 220b and 220c reinforced with the long fiber with an aspect ratio of about 1,000 or more may be disposed, and in this case, the long fiber may account for about 30 wt % to about 70 wt % of the total weight of the total weight of plastic composite forming the long fiber reinforced members 220a, 220b and 220c.

When the weight of the long fiber is less than about 30 wt %, desired mechanical characteristics may not be achieved, and when the weight of the long fiber is greater than about 70 wt %, the flowability may be reduced during the molding, causing reduction of moldability and deterioration of the exterior quality.

According to various embodiments, the long fiber and the continuous fiber may be blended and the blend may be used as a reinforcing fiber for the long fiber reinforced members 220a, 220b and 220c that are separately manufactured.

When the bracket type of continuous fiber reinforced member 212 that constitutes the side bracket of the lower case 200 (FIGS. 3 through 7), and the continuous fiber reinforced members 220a, 220b and 220c that are separately disposed in the lower case 200 (FIGS. 8 through 11) are manufactured, the continuous fiber may account for about 30 wt % to about 70 wt % of the total weight of the plastic composite material forming the reinforced members. When the weight of the long fiber is less than about 30 wt %, desired mechanical characteristics may not be achieved, and when the weight of the long fiber is greater than about 70 wt %, the flowability may be reduced during the molding, causing reduction of moldability and deterioration of the exterior quality.

As described above, in the present invention, the lower case 200 is reinforced with the thermoplastic composite using a reinforcing fiber, particularly a reinforcing fiber of a continuous fiber type. The continuous fiber used in the present invention may distinctly differ from the long fiber with respect to a certain length in that the continuous fiber has a fiber structure without a break in one or mutually crossing directions. Thus, the present invention can provide an additional advantage according to the use of the continuous fiber.

When the continuous fiber is used in a plastic matrix to form the lower case, and a plastic matrix of a continuous fiber reinforced member is further provided, a uni-directional tape or a fabric woven with a continuous fiber may be used.

Here, the uni-directional tape may have an arrangement in which many strands of continuous fiber longitudinally extend in the same direction (strand arrangement), and the continuous fiber fabric may have a woven structure in which the continuous fibers cross each other in the longitudinal and latitudinal directions.

In brief, the continuous fiber of a uni-directional (UD) or woven type may be used. Some examples of the woven type may include plain, twill, and satin types woven at 0°/90° and a type woven at 0°/90°/−45°/45°.

In the present invention, the lower case and the continuous fiber reinforced member may be manufactured using the uni-directional tape or the continuous fiber fabric described above. Accordingly, the lower case and the continuous fiber reinforced member may be manufactured such that the continuous fiber in the plastic matrix may be arranged in one direction or fixed in a form of a woven fiber.

In the embodiments of FIGS. 8, 9 and 11, when the continuous fiber reinforced member in which the continuous fiber is arranged in one direction is used (for example, the uni-directional tape is used as a fiber reinforced material), the continuous fibers in the continuous fiber reinforced member may be arranged in a "crossing direction" with respect to the forward and backward longitudinal direction of the lower case (i.e., the continuous fibers in the continuous fiber reinforced member may be arranged in the right and left width direction with respect to the forward and backward longitudinal direction of the lower case).

Reference numerals 215*a* and 215*b* indicate reinforcing ribs disposed on the bottom of the lower case 200. According to various embodiments, a plurality of reinforcing ribs may be partially or wholly disposed to improve the stiffness of the lower case 200.

The reinforcing ribs 215*a* and 215*b* may be formed on the bottom surface so as to occupy a large area of the lower case 200, and these reinforcing ribs 215*a* and 215*b* may be formed in various shapes including but not limited to L-shape, lattice, net, cross, and honeycomb.

For example, as shown in FIG. 4, a lattice-type reinforcing rib 215*a* may be disposed on the lower surface of the lower case 200, and the separate reinforcing rib 215*b* may be additionally disposed at the inner side of the lattice-type reinforcing rib 215*a* so as to diagonally cross the lattice-type reinforcing rib 215*a*.

The reinforcing ribs 215*a* and 215*b* may further have a combination of structures of various shapes described above.

Thus, when the fiber reinforced plastic composite is used in the present invention, the continuous fiber may be applied to the side brackets or portions where high stiffness is needed, thereby providing the capacity for mass production, and effectively overcoming limitations of dimensional variation and distortion after molding. Also, of the present invention is capable of improving both stiffness and collision characteristics of parts.

Also, since the case is locally reinforced with the continuous fiber in addition to the plastic composite, the weight can be significantly reduced compared to the use of typical steel parts and reinforcing members. Further, various parts such as cross members and side members can be omitted. Accordingly, the present invention can greatly contribute to reduction of the total weight of the lower case and the assembly and the manufacturing cost thereof.

Hereinafter, the present invention will be more specifically described by the following examples. However, it will be apparent to a person skilled in the art that these examples are provided only for illustration of the present invention and are not intended to limit the scope of the present invention.

EXAMPLES

The following examples illustrate the invention and are not intended to limit the same.

Example 1

The lower case 200 and the bracket type of reinforced member 212 were manufactured by an extrusion-compression molding method using a PA6 composite (material-A) that is reinforced with about 30 wt % carbon fiber with an average aspect ratio of about 1,000 (see FIGS. 3 through 7).

Here, the tensile strength and the tensile modulus of the PA6 composite in the longitudinal direction of the fiber were about 250 MPa and about 20 GPa, respectively. Bonding between the lower case 200 and the bracket type of reinforced member 212 was performed by a vibration welding method. During the vibration welding, a weld bead structure was added to an overlapping region of about 1.5 mm (see FIG. 7).

The upper cover 100 was manufactured by the same method using the same PA6 composite (material-A), and the case assembly was completed using the lower case 200 to which the reinforced members 212 are bonded, and the upper cover 100.

A typical case assembly using steel parts was manufactured by welding more than 30 parts, and the total weight of the case assembly was 35 kg. However, in the case assembly according to the example, the weight of the case assembly was reduced to about 11 kg using four parts of the lower case 200 including the plastic composite, the bracket type of reinforced member 212 at the right and left sides, and the upper cover 100.

Also, the vibration endurance test and the sled collision test were performed using the actual battery pack 300, and it was confirmed that certain requirements were all met. After the molding, the contraction rate of the lower case was about 1.5/1,000(0.15%).

Example 2

A planar type of continuous fiber reinforced member 220*a* was manufactured using a composite (material-B) in which about 57 wt % carbon fiber of continuous fiber and woven fiber types was used and PA66 was used as a matrix. After preheating, the continuous fiber reinforced member 220*a* was mounted in the mold of the lower case, and then the material-A of the first example obtained from the extrusion apparatus was overmolded to manufacture the final lower case 200 mounted with the continuous fiber reinforced member 220*a*.

In this case, a bracket type of reinforced member 212 was installed at the side bracket part 211 of the lower case 200 similarly to that of the first example.

The tensile strength and the tensile modulus of the material-B in the longitudinal direction of fiber were about 785 MPa and about 53 GPa, respectively. Due to addition of a carbon fiber fabric reinforced member, the effect of the weight reduction was equivalent to that of the first example, but the contraction rate after the molding was reduced to about ⅟1,000 (0.1%), showing that the dimensional stability was improved.

Thus, according to a battery pack case assembly for an electric vehicle and a method for manufacturing the battery pack case assembly according an embodiment of the present invention, since a lightweight plastic composite is used as case material and a continuous fiber is locally used at a portion where loads are concentrated, it is possible to reduce the weight and simultaneously improve the structural stiffness, the collision characteristics, and the dimensional stability.

Particularly, since a long fiber and a continuous fiber with excellent mechanical properties and dimensional stability are used, typical structure-reinforcing members (i.e., peripheral parts such as cross members, side members, and mounting brackets) can be omitted. Accordingly, various advantages can be attained such as weight reduction, manufacturing process reduction, productivity improvement (mass-producible), and cost savings.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A battery pack case assembly for an electric vehicle, comprising:
    a case body for housing a battery pack;
    a cover removably coupled to the case body,
    wherein the case body is formed of a plastic composite in which a long fiber or a blend of a long fiber and a continuous fiber is used as a reinforcing fiber in a plastic matrix, and
    a first separate reinforced member including at least two brackets each bonded to a side of the case body, the separate reinforced member formed of a plastic composite in which a long fiber, a continuous fiber, or a blend of a long fiber and a continuous fiber is used as the reinforcing fiber in a plastic matrix, and
    a second separate reinforced member having a planar shape being disposed at a bottom of the case body connecting the at least two brackets in the first separate reinforced and disposed perpendicularly planar to the bottom of the case body, wherein the second separate reinforced member disposed at the bottom of the case body is formed of a plastic composite comprising a continuous fiber as a reinforcing fiber in a plastic matrix,
    wherein the case body is integrally formed with the second separate reinforced member by an extrusion-compression molding apparatus and the bottom of the case body is formed in a single layer structure.

2. The battery pack case assembly of claim 1, wherein the long fiber of the case body and the long fiber of the first separate reinforced member both have an aspect ratio of about 1,000.

3. The battery pack case assembly of claim 1, wherein the long fiber of the case body and the long fiber of the first separate reinforced member both have an aspect ratio of about 1,000 to about 10,000.

4. The battery pack case assembly of claim 1, wherein the plastic matrix of the both the first and second separate reinforced member is selected from the group consisting of: Polypropylene (PP), Polyamide (PA), Polyether Ether Ketone (PEEK), Polycarbonate (PC), Polyphenylene Sulfone (PPS), Polyphenylene Ether (PPE), Thermoplastic Polyurethane (TPU), and combinations thereof.

5. The battery pack case assembly of claim 1, wherein the plastic matrix of the case body is selected from the group consisting of Polypropylene (PP), Polyamide (PA), Polyether Ether Ketone (PEEK), Polycarbonate (PC), Polyphenylene Sulfone (PPS), Polyphenylene Ether (PPE), Thermoplastic Polyurethane (TPU), and combinations thereof.

6. The battery pack case assembly of claim 1, wherein the long fiber or continuous fiber of the case body and the long fiber or continuous fiber of the first separate reinforced member are selected from the group consisting of: glass fibers, carbon fibers, aramid fibers, volcanic ash fibers, natural fibers, and combinations thereof.

7. The battery pack case assembly of claim 1, wherein the first separate reinforced member has a bracket type shape with one or more reinforcing ribs, and wherein when the side bracket part of the case body and the reinforced member are coupled to each other a closed-section structural region for absorbing collision energy is formed.

8. The battery pack case assembly of claim 1, wherein the first separate reinforced member is has a planar shape, and is coupled to the opposing side bracket parts of the case body.

9. The battery pack case assembly of claim 1, wherein the second separate reinforced member is bonded to a surface of the bottom of the case body, or is disposed within the bottom of the case body.

10. The battery pack case assembly of claim 9, wherein the surface is an upper surface, a lower surface, or both upper and lower surfaces of the bottom.

11. The battery pack case assembly of claim 1, wherein the continuous fiber of the second separate reinforced member disposed at the bottom of the case body is arranged in one direction in the plastic matrix, or is fixed in a form of a woven fiber in which the continuous fibers cross each other in longitudinal and latitudinal directions.

12. The battery pack case assembly of claim 11, wherein the continuous fiber is longitudinally arranged in one direction in a right and left width direction that is orthogonal to a forward and backward longitudinal direction of the case body.

13. The battery pack case assembly of claim 9, wherein the plastic matrix of the both the first and second separate reinforced member disposed at the bottom of the case body is selected from the group consisting of: Polypropylene (PP), Polyamide (PA), Polyether Ether Ketone (PEEK), Polycarbonate (PC), Polyphenylene Sulfone (PPS), Polyphenylene Ether (PPE), Thermoplastic Polyurethane (TPU), and combinations thereof.

14. The battery pack case assembly of claim 1, wherein the continuous fiber of the second separate reinforced member disposed at the bottom of the case body is selected from the group consisting of: glass fibers, carbon fibers, aramid fibers, volcanic ash fibers, natural fibers, and combinations thereof.

* * * * *